US012067906B2

(12) United States Patent

Murray et al.

(10) Patent No.: US 12,067,906 B2

(45) Date of Patent: Aug. 20, 2024

(54) FOLDABLE Y-FRAME SIGN

(71) Applicant: Timothy J. Murray, Kaneohe, HI (US)

(72) Inventors: Timothy J. Murray, Kaneohe, HI (US); Paul Dowd, Scarsdale, NY (US); Jeffry Han Katz, Chicago, IL (US); Bennet Otto Poepping, Tuckahoe, NY (US)

(73) Assignee: Timothy J. Murray, Kaneohe, HI (US)

( * ) Notice: Subject to any disclaimer, the term of this patent is extended or adjusted under 35 U.S.C. 154(b) by 148 days.

(21) Appl. No.: 17/945,621

(22) Filed: Sep. 15, 2022

(65) Prior Publication Data

US 2023/0078658 A1 Mar. 16, 2023

Related U.S. Application Data

(60) Provisional application No. 63/244,435, filed on Sep. 15, 2021.

(51) Int. Cl.

*G09F 7/22* (2006.01)
*G09F 7/18* (2006.01)

(52) U.S. Cl.

CPC ........ *G09F 7/22* (2013.01); *G09F 2007/1843* (2013.01)

(58) Field of Classification Search

CPC ............. G09F 15/0012; G09F 15/0018; G09F 15/0062; G09F 15/0068; G09F 7/22; G09F 2007/1843

See application file for complete search history.

(56) References Cited

U.S. PATENT DOCUMENTS

| | | | | | |
|---|---|---|---|---|---|
| 930,509 | A * | 8/1909 | Warfield | G09F 15/0062 | 40/610 |
| 4,005,537 | A * | 2/1977 | von Camber | G09F 1/10 | 40/611.12 |
| 4,253,260 | A * | 3/1981 | Maza | G09F 15/0062 | 116/63 P |
| 4,796,369 | A * | 1/1989 | Hamann | E01F 9/688 | 116/63 P |
| 4,875,302 | A * | 10/1989 | Noffsinger | G09F 15/0062 | 248/150 |
| 4,999,937 | A * | 3/1991 | Bechtold | E01F 9/688 | 16/329 |
| 6,003,257 | A * | 12/1999 | Stokes | G09F 15/0062 | 404/6 |
| 6,131,320 | A * | 10/2000 | Eberle | G09F 15/0062 | 40/606.19 |

(Continued)

*Primary Examiner* — Gary C Hoge

(74) *Attorney, Agent, or Firm* — Fishman Stewart PLLC

(57) ABSTRACT

A foldable display includes a first frame, a second frame, and a third frame. The display includes a first frame hinge that rotatably couples the first frame to the second frame about a first axis. The display includes a second frame hinge that rotatably couples the second frame to the third frame about a second axis. A linkage assembly is attached to the first frame and to the second frame. The linkage assembly limits a maximum angle between the first frame and the second frame when the linkage assembly is fully extended, creating a base structure with the first frame and the second frame, supporting the foldable display. The display includes a clasp rotatably about a clasp hinge and attached to the third frame. The clasp is attachable to the first frame at a clasp receiver.

20 Claims, 9 Drawing Sheets

(56) References Cited

U.S. PATENT DOCUMENTS

| | | | | |
|---|---|---|---|---|
| 6,507,287 | B1 * | 1/2003 | Barnett | E01F 9/688<br>116/63 P |
| 8,555,535 | B1 * | 10/2013 | Watson | G09F 15/0062<br>40/611.08 |
| 8,800,187 | B2 | 8/2014 | Peterson | |
| 9,286,814 | B1 * | 3/2016 | Thomaselli | G09F 15/00 |
| 9,548,011 | B1 * | 1/2017 | Banks | G09F 15/0062 |
| 2004/0244670 | A1 * | 12/2004 | Young | G09F 15/0062<br>40/606.01 |
| 2005/0108911 | A1 * | 5/2005 | Perelli | G09F 15/0062<br>40/610 |
| 2008/0216370 | A1 * | 9/2008 | Glass | G09F 15/0062<br>40/606.01 |
| 2011/0239506 | A1 * | 10/2011 | Glass, Jr. | G09F 15/0062<br>40/606.01 |
| 2013/0050060 | A1 * | 2/2013 | Ranger | G09F 15/0062<br>345/1.1 |
| 2021/0304645 | A1 * | 9/2021 | Owen | G09F 15/0012 |

* cited by examiner

FOLDABLE Y-FRAME SIGN

CROSS-REFERENCE TO RELATED APPLICATION

This application claims the benefit of United States Provisional Patent Application Ser. No. 63/244,435 filed on Sep. 15, 2021, the disclosure of which is hereby incorporated by reference in its entirety as though fully set forth herein.

TECHNICAL FIELD

The disclosure relates generally to a new and improved Y-frame styled sign that is foldable and movable using wheels integrated therewith.

BACKGROUND

Temporary, movable signage is used for providing displays of information that can be set up for brief periods of time and moved about as necessary. In real estate, such signage for example, impresses upon potential visitors to an 'open house', during the sale of a residential home or office space. Often it is beneficial to be able to carry and display one or more signs during a temporary event, such as an open house that may be available to the public for a limited duration.

Known in the art are temporary and collapsible banner pop up signs. However, such banner signs may be difficult or cumbersome to set up and/or to collapse. Such designs may also be subject to heavy wind and can be blown from their temporary location unless tied down to a grassy area, or otherwise anchored to a heavy object or a wall. Anchoring temporary banners, such as via stakes, may be limited to grassy-type areas, which may not be convenient or possible based on the surfaces available where signage is needed. For example, concrete or blacktop surfaces may not allow a temporary banner to be anchored to the ground.

Another solution known in the art includes one or more posters. However, posters may be light and flimsy, as well as susceptible to heavy winds and precipitation. Framing or another structure may be provided to support the poster(s), but framing can be cumbersome, difficult to work with, and hard to travel with.

Hand-made temporary signage may be impromptu and have an unprofessional appearance which may disinterest intended readers of the signage, such as a potential visitor to an 'open house'. On the other hand, more formal signage may be hard mounted to the ground or otherwise anchored with, for instance, blocks used in home construction which may be more permanent fixtures. However, examples of this signage can be expensive, time-consuming, and difficult to implement, especially when the purpose of such signage is to be temporary, being set up for a brief event where quick and easy setup and takedown are important.

Additionally, other known display systems have previously been utilized, however are difficult to use and may only be used with specific dimension signs. For example, plastic and metal displays include systems for applying signs that damage and/or break signs. Users may need to force and bend signs to get them into place on the display, causing the damage. These displays are usually flush around the sign, causing a user to force their fingers between the sign and the frame to pull a sign out of the display, which can be dangerous and lead to finger injuries. These known displays also lack in their ability to handle signs of varying sizes, for instance, riders which are frequently used in the real estate industry. Riders are small signs which accompany a larger sign in a real estate frame, for instance the narrow signs indicate 'for sale' or 'sold' and may be seen hanging from or standing on top of a real estate sign. Known displays may not include the necessary framework for displaying a rider or other sign which is not the exact dimensions of the display.

Therefore, a need exists for an improved temporary signage system that can be easy to travel with, set up, and takedown, while remaining professional in appearance.

BRIEF DESCRIPTION

The disclosure is directed towards a foldable display and a foldable display system for setting up temporary signage.

According to one aspect, a foldable display includes a first frame, a second frame, and a third frame. A first frame hinge rotatably couples the first frame to the second frame about a first axis. A second frame hinge rotatably couples the second frame to the third frame about a second axis. A linkage assembly is attached to the first frame and to the second frame. The linkage assembly limits the maximum angle between the first frame and the second frame about the first frame hinge when the linkage assembly is fully extended. The first frame and the second frame create a base structure when the linkage assembly is fully extended, supporting the foldable display. The foldable display includes a clasp having a clasp hinge. The clasp is attached to the third frame at a first clasp end and via the clasp hinge. The clasp is rotatable about the clasp hinge. The clasp is attachable to the first frame at a second clasp end opposite the first clasp end. The clasp is attachable via a clasp receiver.

According to another aspect, a foldable display system includes a first frame, a second frame, and a third frame. A first frame hinge rotatably couples the first frame to the second frame. A second frame hinge rotatably couples the second frame to the third frame. A linkage assembly is attached to the first frame and the second frame. The linkage assembly limits a maximum angle between the first frame and the second frame when the linkage assembly is fully extended. The first frame, the second frame, and the third frame include outer surfaces. The outer surfaces include a placard engaging surface and a set of tabs for receiving a placard on the placard engaging surface.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Figure 1:
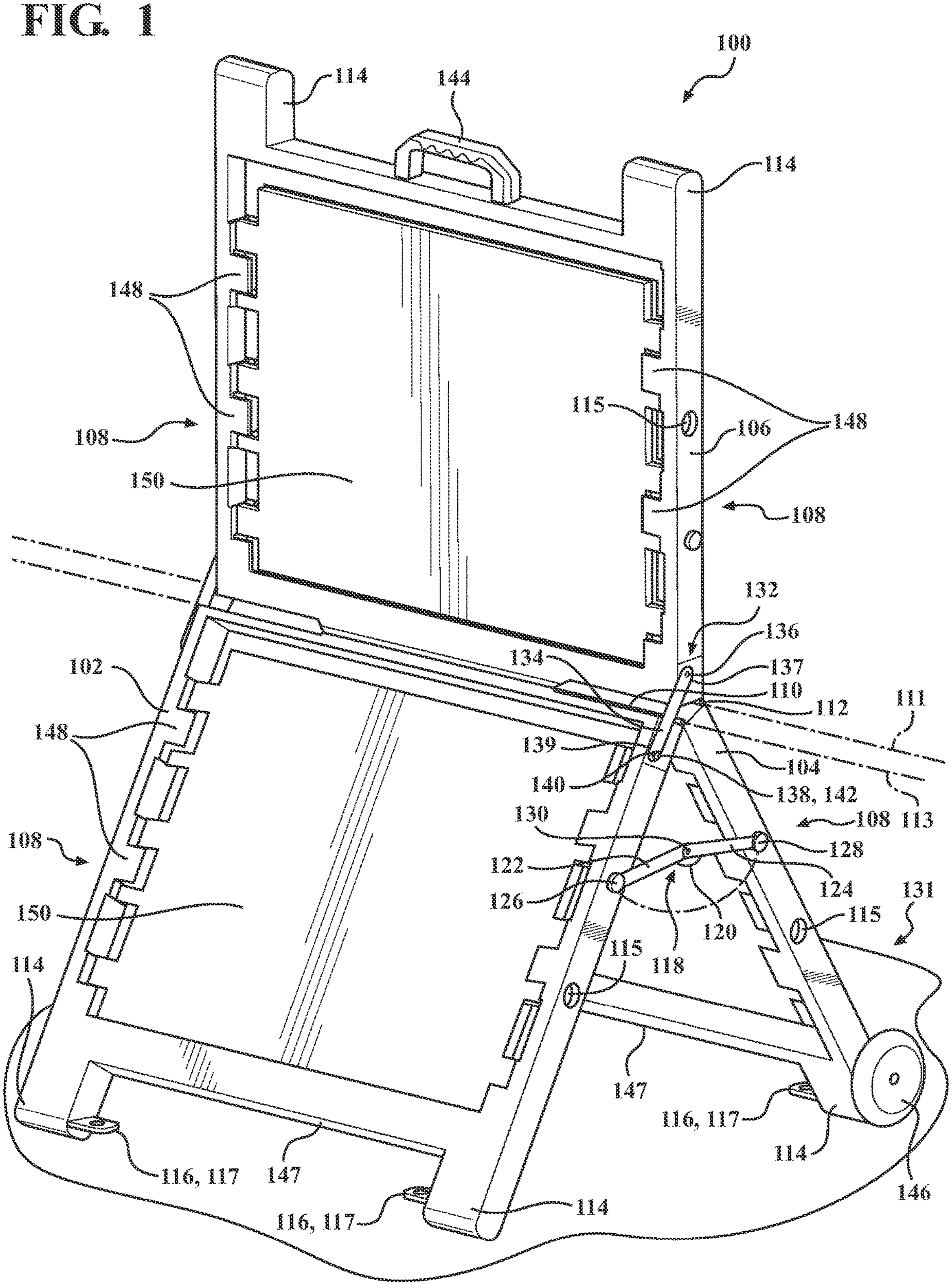
FIG. 1 is a perspective view generally illustrating a foldable sign in a fully deployed position.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

The disclosure relates generally to a foldable display and a foldable display system. An exemplary foldable display may include a first frame, a second frame, and a third frame. The first frame and the second frame may be rotatable about a first frame hinge at a first axis. The second frame and the third frame may be rotatable about a second frame hinge at a second axis. A linkage assembly may attach to the first frame and the second frame, limiting a maximum angle between the first frame and the second frame when the linkage assembly is fully extended.

Figure 8:
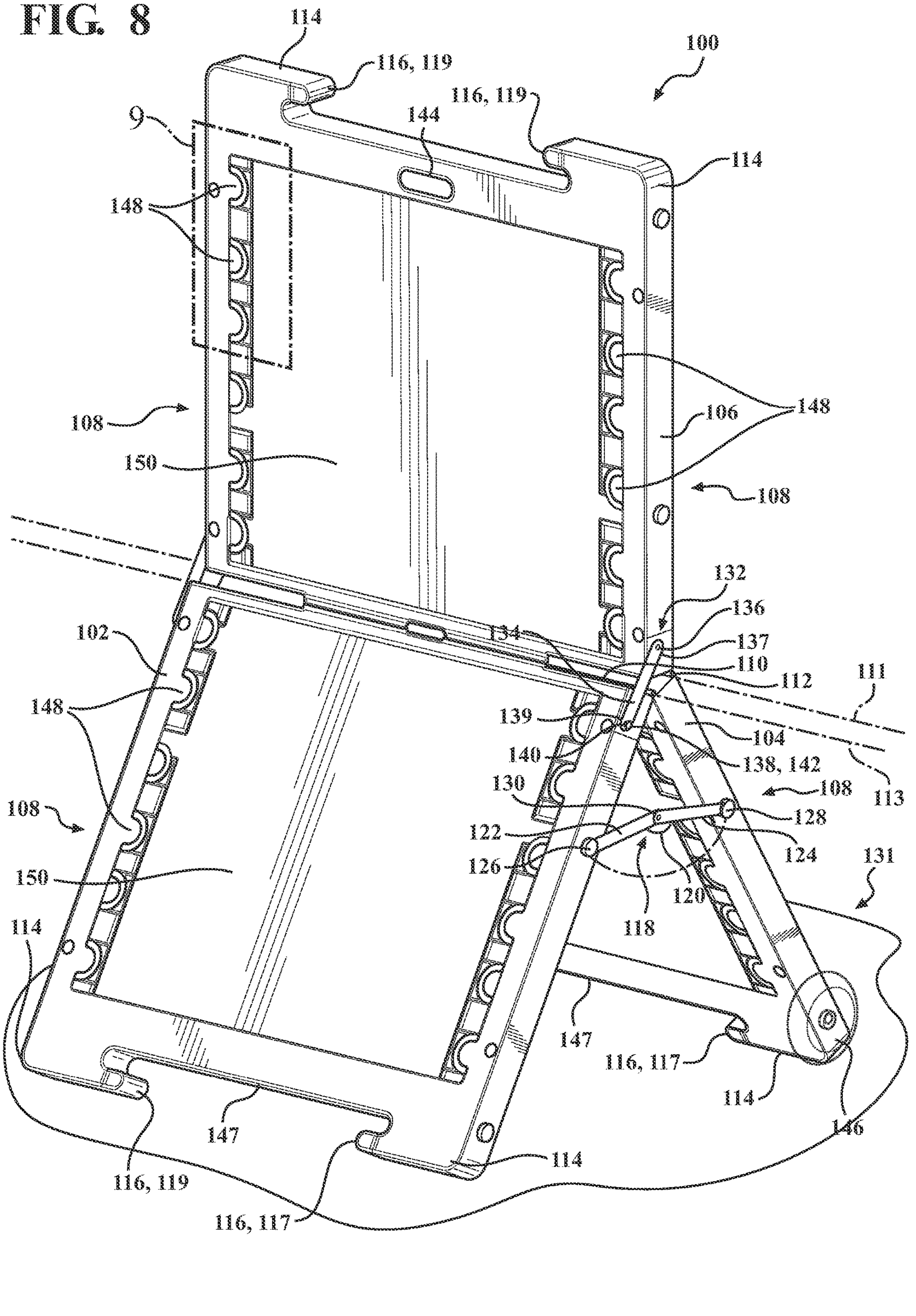
FIG. 8 is a perspective view generally illustrating a foldable sign in a fully deployed position.

Referring to the figures, FIGS. 1 and 8 are perspective views generally illustrating a foldable display 100 in a deployed position. Display 100 includes a first frame 102, a second frame 104, and a third frame 106. Frames 102, 104, 106 are used as visual displays for displaying information, for example an 'open house' placard for use by a real estate agent. First frame 102 includes an outer surface 108 for receiving a placard. Second frame 104 includes an outer surface 108 for receiving a placard. Third frame 106 includes two outer surfaces 108 for receiving two placards. Thus, four outer surfaces 108 are included which each may receive placards for displaying information. First frame 102 and second frame 104 include only one outer surface 108 each, as one side of first frame 102 and second frame 104 face each other, creating a base support in a deployed position, where the surface is not visible for a display. Third frame 106 may be positioned in a deployed position where both sides are outer surfaces 108 such that the surface is visible on both sides for display.

As illustrated in FIGS. 1, 4A-4C, 7, and 8, first frame 102 and second frame 104 are rotatably attached at a first frame hinge 110 about a first axis 111. First frame hinge 110 is attached to a top surface 145 of first frame 102 and second frame 104 such that first frame 102 and second frame 104 may rotate about first axis 111 of first frame hinge 110 at the top surface 145 of frames 102, 104. Second frame 104 and third frame 106 are rotatably attached at a second frame hinge 112 about a second axis 113. Second frame hinge 112 is attached at a top surface 145 of second frame 104 and third frame 106 such that second frame 104 and third frame 106 may rotate about second axis 113 of second frame hinge 112 at top surface 145 of frames 104, 106. First frame hinge 110 and second frame hinge 112 allow first frame 102, second frame 104, and third frame 106 to be positionable in at least a compact position and a deployed position. First frame hinge 110 and second frame hinge 112 may also allow first frame 102, second frame 104, and third frame 106 to be positionable in a variety of additional positions, including an intermediate position and a traveling position to be described in detail later. First frame hinge 110 and second frame hinge 112 are illustrated as ball-bearing hinges, but may be another hinge which allows for rotational movement between two adjacent frames.

Figure 3:
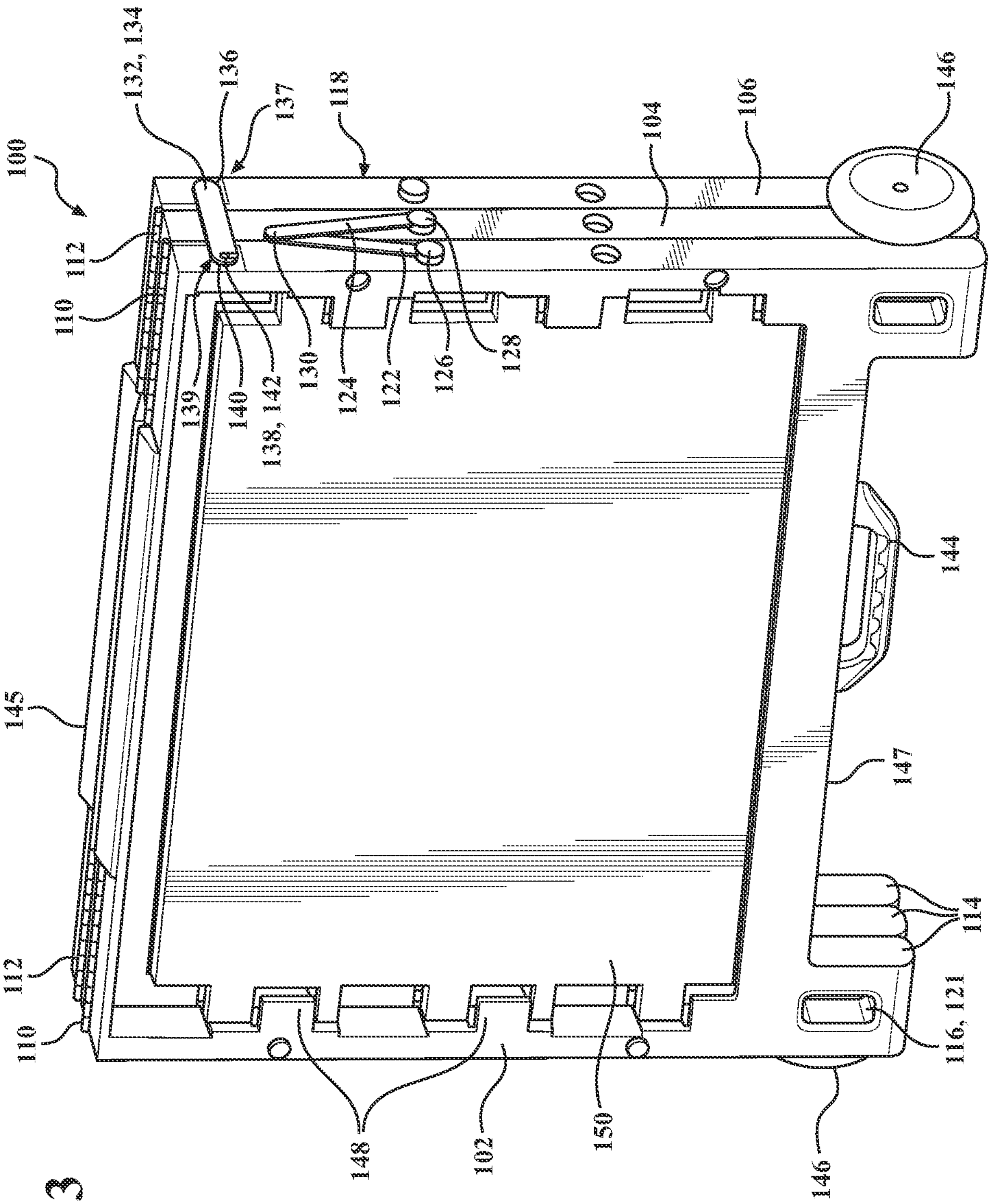
FIG. 3 is a perspective view generally illustrating a foldable sign in a compact position.
Figure 7:
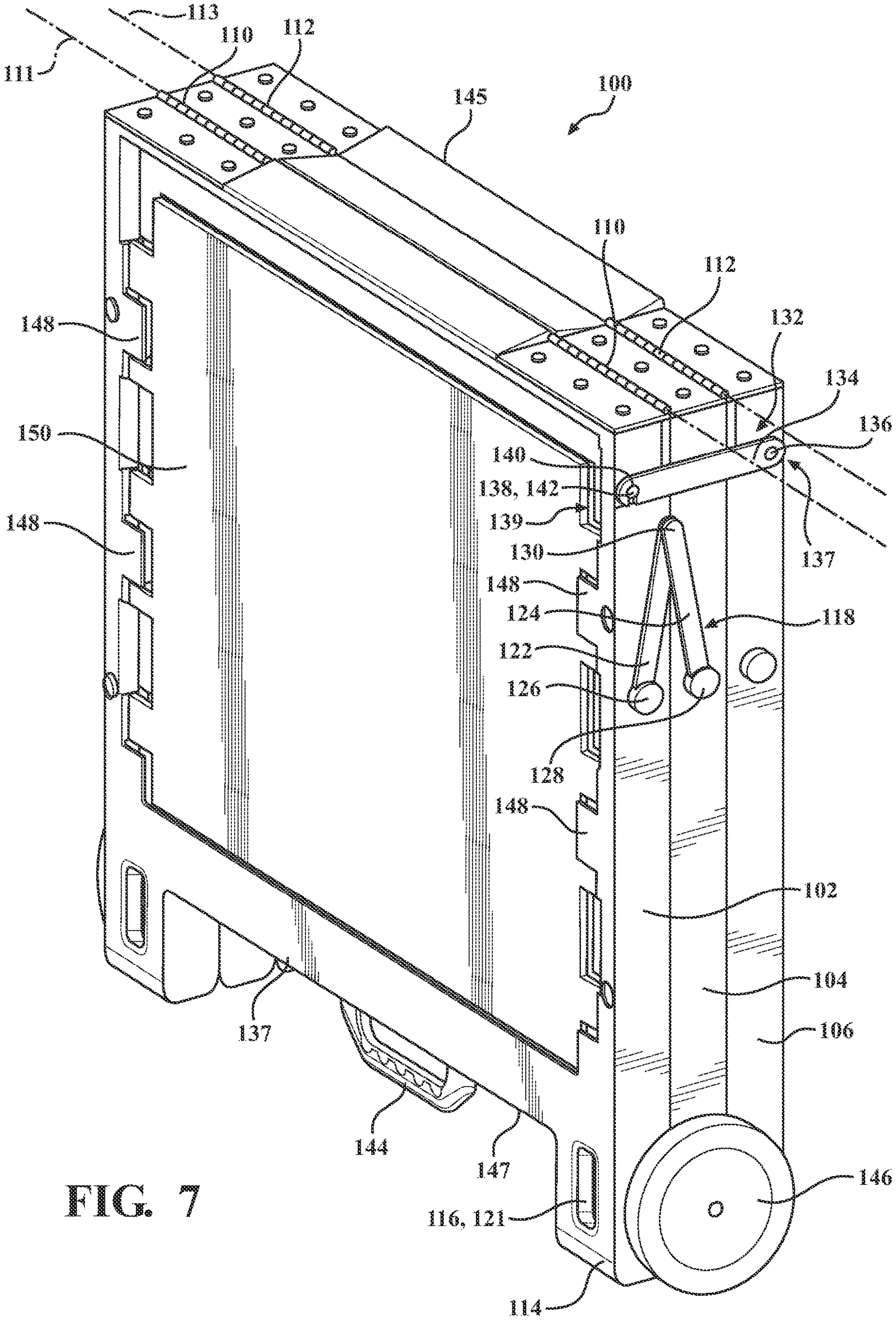
FIG. 7 is a side view generally illustrating a hinge used in connection with a foldable sign.

First frame 102, second frame 104, and third frame 106 are generally square in shape, but another shape and different sized frames may be used. At a bottom surface 147 of frames 102, 104, 106 and opposite first frame hinge 110 and second frame hinge 112, frames 102, 104, 106 include a set of feet 114 on bottom surface 147. Feet 114 are positioned as a base for frames 102, 104, 106 such that feet 114 rest on the ground and elevate sign 100 on the ground. Feet 114 may include anchoring locations 116 for receiving an anchoring device, for example, for a user to attach stakes to display 100. Anchoring locations 116 may be configured as metal hooks 117 extending from feet 114 as illustrated in FIG. 1, which may, for example, allow a u-shaped tent peg to be applied to anchoring location 116 to secure display 100 to ground. As illustrated in FIG. 8, anchoring locations 116 may be integrated into feet 114 as a plastic hook 119 extending from feet 114. In such embodiments, u-shaped pegs may be placed over hook 119 to secure display 100 to ground. Anchoring location 116 may additionally be an aperture 121 in feet 114 as shown in FIGS. 3 and 7. Aperture 121 is configured to allow a u-shaped stake or other anchoring device to be inserted through aperture and secured to the ground on either side of aperture 121. Anchoring devices may be used to offer higher stability to display 100 in a deployed position. For example, if display 100 is deployed when the conditions include high wind, additional anchoring devices may be attached at anchoring location 116 to secure display 100 to the ground. Anchoring location 116 may also receive stakes or other anchoring devices when display 100 is used on surfaces which may require additional stability such as on rocky or muddy surfaces.

First frame 102, second frame 104, and third frame 106 are hollow, such that display 100 is lightweight and easy to carry from location to location. To provide additional stability in a deployed position, first frame 102, second frame 104, and third frame 106 include plug holes 115. Plug holes 115 may be used to fill frames 102, 104, 106 with materials such as sand or water to provide additional weight to display 100 when desired. Adding material such as sand to weigh down display 100 provides a more secure and stable base, preventing display 100 from moving or falling in less then ideal conditions such as when it is windy or display 100 is on uneven surfaces. Plug holes 115 may also be used for emptying sand from frames 102, 104, 106 when display 100 is being broken down, thus making display 100 lightweight and easily transportable again.

Display 100 includes a linkage assembly 118 for attaching first frame 102 to second frame 104. Linkage assembly 118 allows a maximum angle of rotation 120 to occur between first frame 102 and second frame 104 when first frame 102 and second frame 104 are in a deployed position. Maximum angle 120 creates a base structure 131 between first frame 102 and second frame 104 such that frames 102, 104 may stand on the ground, creating a structure which is supported by feet 114 of first frame 102 and second frame 104. Linkage assembly 118 creates a maximum angle 120 of approximately sixty degrees for superior stability of base structure 130. Maximum angle 120 is provided such that sign 100 may be utilized in a variety of conditions including its ability to sustain conditions of wind or rain which typical signage may be unable to withstand.

Figure 2:
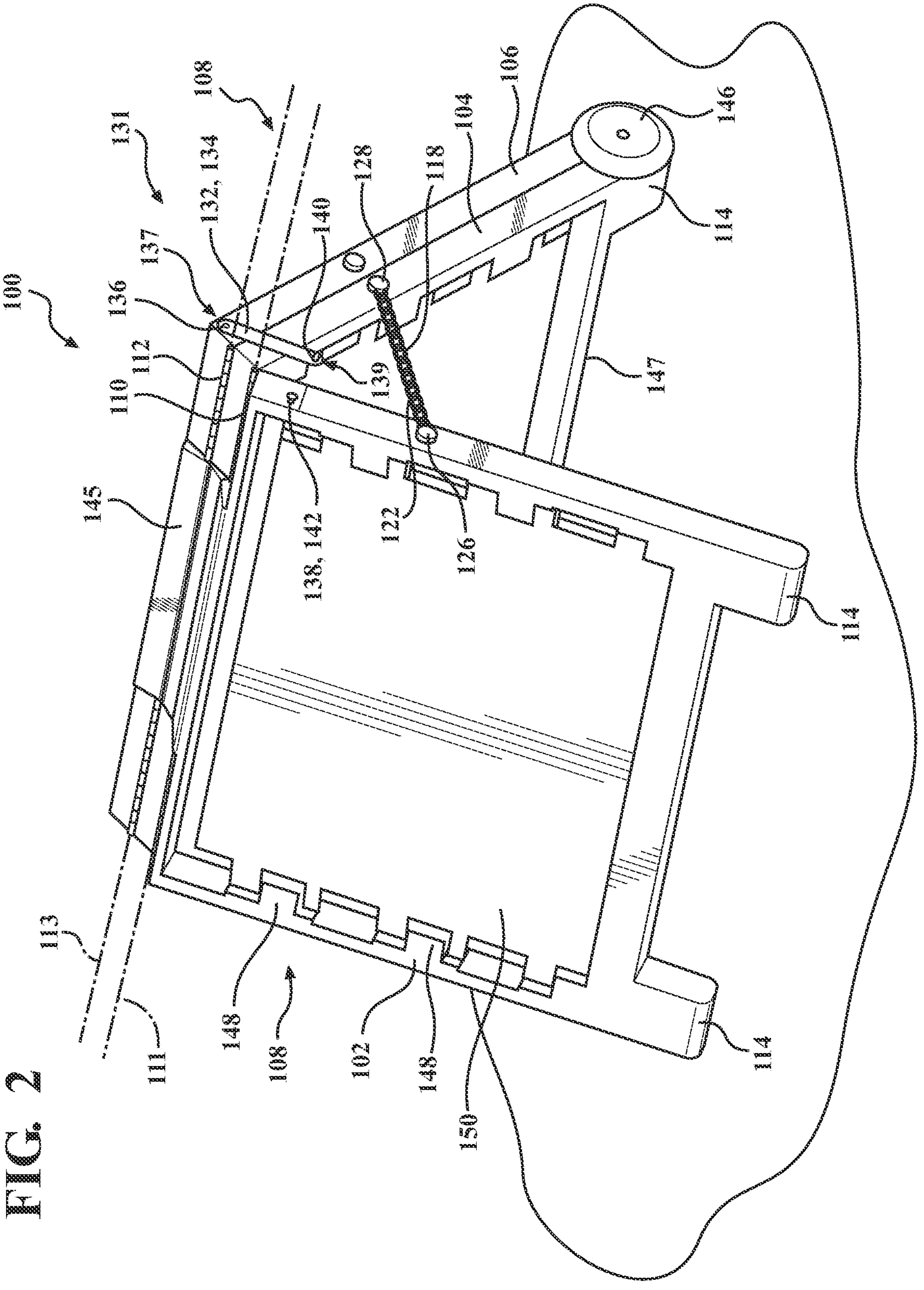
FIG. 2 is a perspective view generally illustrating a foldable sign in an intermediate deployed position.

As illustrated in FIGS. 1, 4A-4C, and 8, linkage assembly 118 includes a first linkage 122 and a second linkage 124. First linkage 122 may be rotatably attached to first frame 102 at a first linkage hinge 126. Second linkage 124 may be rotatably attached to second frame 104 at a second linkage hinge 128. First linkage 122 and second linkage 124 may attach at a rotatable third linkage hinge 130. First linkage 122 and second linkage 124 may be metal hinges which rotate such that in a compact position, first linkage 122 and second linkage 124 may be substantially vertical, minimizing the angle between first frame 102 and second frame 104 such that frames 102, 104 are adjacent to each other. In a deployed position, first linkage 122 and second linkage 124 rotate around first linkage hinge 126 and second linkage hinge 128, straightening between first frame 102 and second frame 104 to create maximum angle 120. In other embodiments and as illustrated in FIG. 2, linkage assembly 180 may include first linkage 122 only. For example, first linkage 122 may attach to first frame 102 at first linkage hinge 126 and attach to second frame 104 at second linkage hinge 128. In such examples, first linkage 122 may be flexible or a loose structure such as a rope or chain. First linkage 122 may be loose in a compact position or pulled taught to allow for maximum angle 120 in a deployed position.

As illustrated in FIGS. 1, 4A-4C, and 8, display 100 may include a clasp assembly 132. Clasp assembly 132 includes a clasp arm 134 which is attached to third frame 106 at a first clasp end 137 and via a clasp hinge 136. Clasp arm 134 is rotatable around clasp hinge 136. Clasp arm 134 includes a cut out 140 at a second clasp end 139, opposite first clasp end 137. Cut out 140 interacts with a clasp receiver 138 on first frame 102. Clasp receiver 138 may be configured as a pin 142 for being received in cut out 140 of clasp arm 134. In a compact position, clasp arm 134 may extend from third frame 106 to clasp receiver 138 on first frame 102 in a substantially horizontal manner. Clasp arm 134 may lock in place when pin 142 is inserted into cut out 140 to secure frames 102, 104, 106 and keep display 100 in compact position. A user may release pin 142 from cut out 140 to unlock display 100 to transition to a deployed position. In a deployed position, clasp arm 134 may extend from third frame 106 to first frame 102 in a substantially vertical manner. Clasp arm 134 is configured to lock in place when cut out 140 is positioned around pin 142. Locking clasp arm 134 when in the deployed position keeps third frame 106 in a substantially vertical position relative to base structure 131 created from first frame 102 and second frame 104. Clasp arm 134 also adds stability to third frame 106 when it is deployed to ensure sign 100 stays deployed in a variety of conditions, including wind. In various additional positions such as the intermediate position and in a transport position, clasp arm 134 may remain unlocked such that cut out 140 is not positioned around pin 142. Clasp arm 124 may be in the unlocked position as position of third frame 106 requires less stability in a transport or intermediate position.

Figure 6:
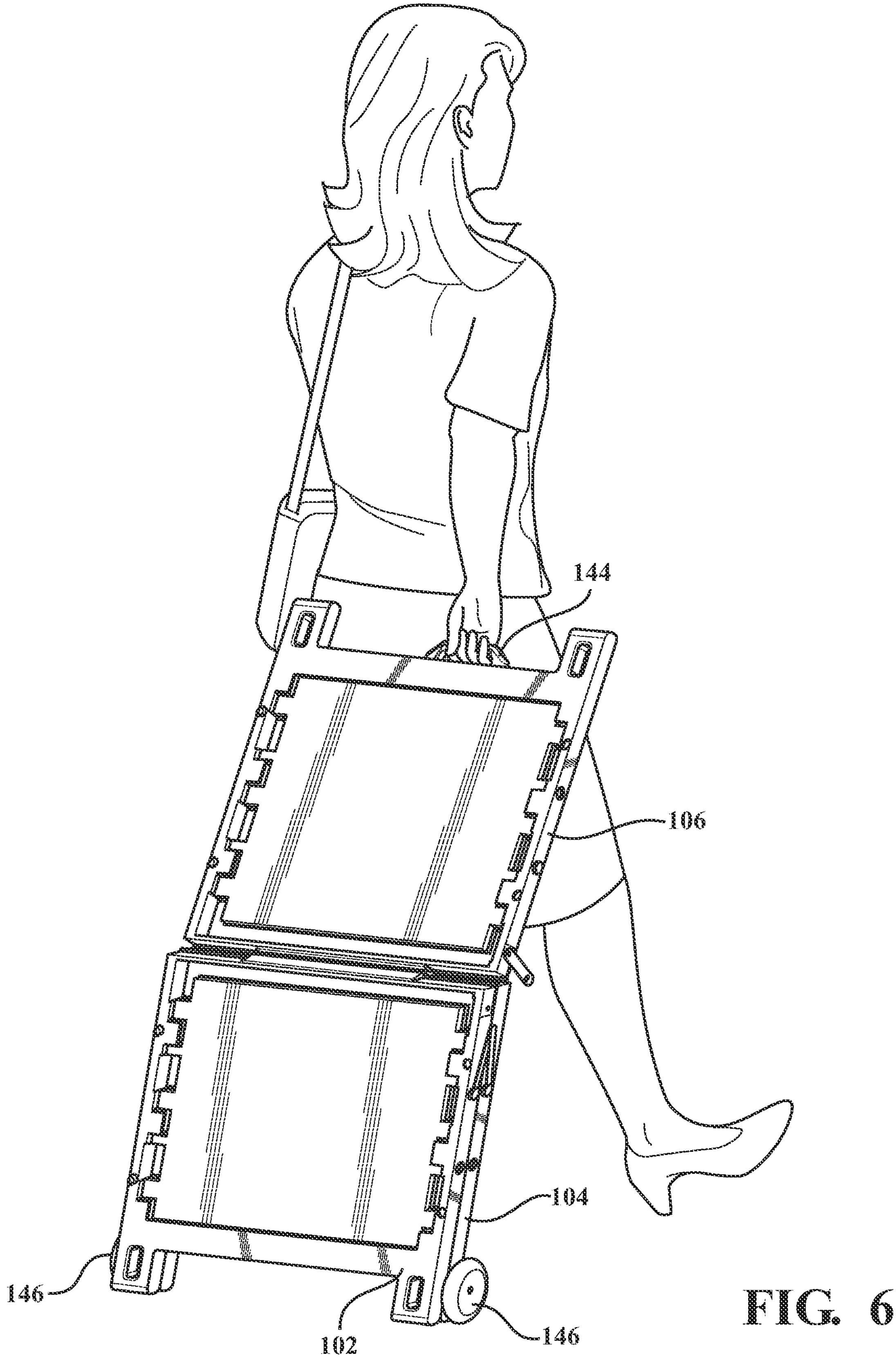
FIG. 6 is a perspective view generally illustrating a foldable sign in a transport position.

As illustrated in FIGS. 1, 6, and 8, third frame 106 includes a handle 144 at a center of bottom surface 147 of third frame 106. Handle 144 may be attached to third frame 106 such that it extends from frame 106 as illustrated in FIG. 1. And, although item 144 is illustrated and described as a handle, it is contemplated that handle 144 can also be a strap, grip or other device that enables the assembly to be held, carried, or controlled. Handle 144 may also be built into frames 102, 104, 106 as a cutout in top surface 147 of frames 102, 104, 106 as illustrated in FIG. 8. Top surface 145 of frames 102, 104, 106 is that which is positioned at a top of frames 102, 104, 106 when in a compact position, and shares the surface with frame hinges 110, 112. Bottom surface 147 of frames 102, 104, 106 is that which is positioned at a bottom of frames 102, 104, 106 when in a compact position, and shares the surface with feet 114 of display 100. In addition to be used for transportation of display 100, handle 144 when integrated into third frame 106 as a cutout may be used to pull placards 152 out of a placard engaging surface 150 to be described below.

Handle 144 may be used such that a user can pull display 100 from one location to a second location with ease. A user may rotate third frame 106 from a position adjacent to second frame 104 to a position approximately one hundred and eighty degrees from first frame 102 and second frame 104 (e.g., a transport position) such that bottom surface 147 of third frame 106 is in an upright position. In this transport position, display 100 is substantially straight in shape, with first frame 102 and second frame 104 adjacent to each other, and third frame 106 rotated about second frame hinge 112 such that third frame 106 is substantially on top of first frame 102 and second frame 104. Handle 144 on third frame 106 faces substantially upward toward a user.

Display 100 may include a pair of wheels 146 positioned adjacent feet 114 on bottom surface 147 of second frame 104. Wheels 146 may be attached to the outside of feet 114 such that stakes or anchoring devices may still be attached to feet 114 of second frame 104 at anchoring location 116. One wheel of the set of wheels 146 may be located on a left side of bottom surface 147 and a second wheel of set of wheels 146 may be located on a right side of bottom surface 147 to distribute weight of display 100 evenly on each of the first wheel and the second wheel of the set of wheels 146 in a transport position. Wheels 146 and handle 144 are configured such that in a transport position as illustrated in FIG. 6, a user may hold handle 144 to pull display 100 via wheels 146. The transport position allows a user to relocate signs from one location to a second location, for example, from a vehicle to a sidewalk location where display 100 will be deployed. Wheels 146 are positioned on bottom surface 147 of second frame 104 such that when first frame 102 and second frame 104 are in base structure 131 position and resting on ground, wheels 146 are raised slightly above the bottom surface of feet 114 and do not touch the ground. This allows display 100 to be on an angled surface and wheels 146 won't roll due to gravity. Once second frame 104 is tilted into a transport position, wheels 146 may engage the ground and allow a user to roll display 100.

As illustrated in FIGS. 1-3 8, and 9, outside surfaces 108 of first frame 102, second frame 104, and third frame 106 include a plurality of placard engagement tabs 148. Tabs 148 are spaced apart along the lateral sides of outside surfaces 108. For example, a left lateral side of outside surface 108 may include three tabs 148 and a right lateral side of outside surface 108 may include three tabs 148. Tabs 148 are configured to extend from the lateral sides of outside surface 108 into the middle of frames 102, 104, 106. Tabs 148 extend into middle of frame 102, 104, 106 over a placard engaging surface 150 such that a placard 152 may be placed between placard engaging surface 150 and placard engaging tabs 148. A placard 152 may be inserted on top of placard engaging surface 150 and below placard engaging tabs 148 such that tabs 148 keep placard 152 positioned on placard engaging surface 150. Placard engaging tabs 148 are positioned with enough space between placard engaging surface 150 to receive placards 152 with ease, but also to be tight enough to ensure placard 152 remains in place, preferably approximately 6.5 mm. Tabs 148 are utilized to attach placard 152 to placard engaging surface 150 so that a user may easily insert or remove placards 152 so display 100 may be reusable with different placards 152, or so placards 152 may be rotated based on deployment of display 100 from an intermediate position to a fully deployed position, as described below. Tabs 148 may be distanced from one another and distanced from edge of frame 102, 104, 106 such that a user may pull placards 152 out of sign at corners of placard engaging surface 150. In embodiments where handle 144 is integrated into frames 102, 104, 106, handle 144 may be positioned such that one end of handle 144 is positioned such that a user may insert their hand into handle 144 and with ease have access to back of placard 152 to pull placard 152 out of placard engaging surface 150. Tabs 148 are positioned every six inches, but additionally tabs 148 could be added in between. Positioning of tabs 148 allows placards 152 of a variety of sizes to be inserted into display 100. For instance, smaller signs such as riders may sit in display 100 with ample support from at least two tabs 148 per lateral sign, or larger square signs which are typical of real estate signage may sit in display 100 with support from all tabs 148.

Placard engaging tabs 148 allow a user to place placard 152 by sliding a first side into tabs 148 on a first lateral side of placard engaging surface 150. Then, user may warp placard 152 without bending or damaging to placard 152 to slide a second side into tabs 148 on a second lateral side of placard engaging surface 150. In instance of metal signs where warping placard 152 is not possible, a user may place a placard 152 into tabs 148 on both lateral sides at a top of placard engaging surface 150 and slide placard 152 down behind further tabs 148 until placard rests fully behind all necessary tabs 148. Both methods of placing placard 152 allow a user to insert and/or remove placard 152 with ease and without damaging placard 152.

FIG. 1 illustrates display 100 in a fully deployed position. First frame 102 and second frame 104 are rotated around first frame hinge 110 to maximum angle 120 allowed by linkage assembly 118. Maximum angle 120 is approximately sixty degrees to create a stable base structure 131. Third frame 106 is rotated around second frame hinge 112 to stand substantially upward from top of base structure 131, approximately one hundred and fifty degrees from second frame 104. Fully deployed position creates a stable base structure 131 with added height to sign 100 to provide a visual display further off the ground, which may be easier for spectators to see from further away. In fully deployed position, first frame 102 and second frame 104 each include an outer surface 108 for displaying a placard 152. Third frame 106 includes two outer surfaces 108 capable of displaying placard 152 on each. In the fully deployed position, each of the four outer surfaces 108 may have placard 152. Additionally, placard 152 may be displayed in both outer surface 108 of one of first frame 102 or second frame 104 and outer surface 108 of the corresponding outer surface 108 of third frame 106 such that placard 152 extends vertically to be held by two outer surfaces 108. This is ideal for placards 152 of a different dimension that are taller than frames 102, 104, 106. Wheels 146 sit just above the ground such that feet 114 are the only portion of display 100 resting on ground.

FIG. 2 illustrates display 100 in an intermediate position. First frame 102 and second frame 104 are rotated around first frame hinge 110 to maximum angle 120 by linkage assembly 118 to create stable base structure 131. In an intermediate position, third frame 106 is not deployed, for instance, when conditions are more windy and higher stability of display 100 is necessary. Third frame 106 is adjacent to second frame 104 such that one outer surface 108 of third frame 106 is displayed and one outer surface 108 of first frame 102 is displayed. The outer surface 108 of second frame 104 and the second outer surface 108 of third frame 106 are hidden and not utilized in an intermediate position.

FIG. 3 illustrates display 100 in a compact position. First frame 102, second frame 104, and third frame 106 are all positioned immediately adjacent to each other such that the frames 102, 104, 106 are not rotated around first frame hinge 110 and/or second frame hinge 112. Clasp arm 134 locks first frame 102 to third frame 106 such that frames 102, 104, 106 are unable to rotate around first frame hinge 110 and/or second frame hinge 112. Display 100 remains in compact position such that a user may reduce the size of display 100 and easily move display 100, for example, if a user packs display 100 into a vehicle to take to a new location or when a display is in storage between uses. Handle 144 may be used to carry display 100 in the compact position.

Figures 4A, 4B, 4C:
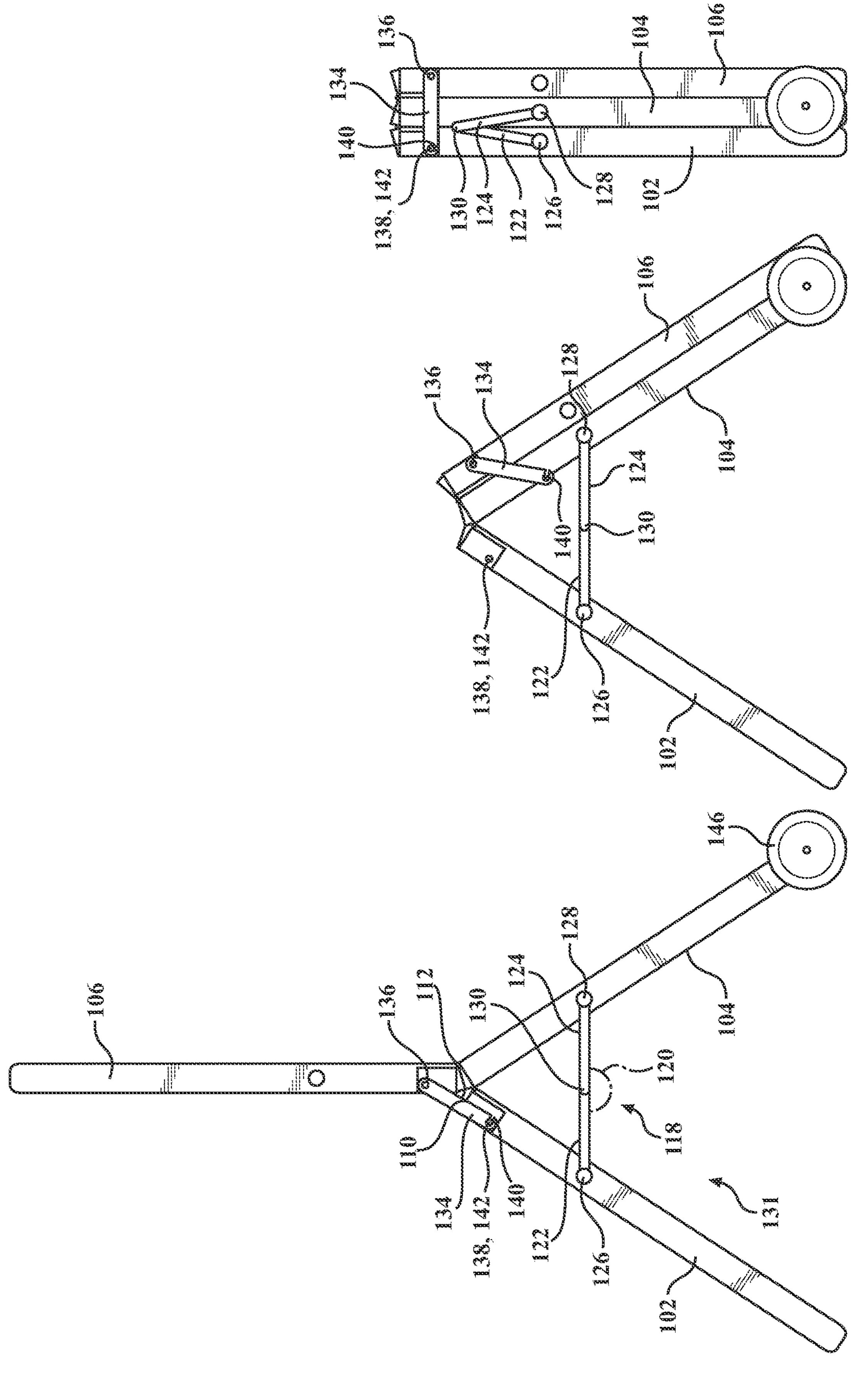
FIG. 4A is a side view generally illustrating a foldable sign in a fully deployed position.
FIG. 4B is a side view generally illustrating a foldable sign in an intermediate deployed position.
FIG. 4C is a side view generally illustrating a foldable sign in a compact position.

FIGS. 4A-4C illustrate display 100 from a side view in a deployed position (FIG. 4A), an intermediate position (FIG. 4B), and a compact position (FIG. 4C). As shown in FIG. 4A, linkage assembly 118 is fully extended to maximum angle 120 between first frame 102 and second frame 104, creating base structure 131. Third frame 106 is rotated to stand substantially upright from base structure 131 about second frame hinge 112. Clasp arm 134 extends from third frame 106 to first frame 102, with pin 142 positioned inside cut out 140 of clasp arm 134. Clasp arm 134 is in a locked position to prevent additional rotation of third frame 106 relative to first frame 102. As presented in FIG. 4B, display 100 is in an intermediate position. Linkage assembly 118 is fully extended to maximum angle 120 between first frame 102 and second frame 104, creating base structure 131. Third frame 106 has not been deployed, and thus is adjacent to second frame 104, with no rotation about second frame hinge 112. Clasp arm 134 is not attached to first frame 102, as it is not necessary in intermediate position to keep third frame 106 in position. Gravity keeps third frame 106 in a downward position, adjacent to second frame 104. As illustrated in FIG. 4C, display 100 is in compact position. First frame 102 and second frame 104 are positioned immediately adjacent to each other with no rotation about axis of first frame hinge 112. Linkage assembly 118 is positioned to allow the minimum angle between first frame 102 and second frame 104. In the illustrated embodiment with a first linkage 122 and a second linkage 124, first linkage 122 and second linkage 124 extend in a substantially vertical direction, bent at a third linkage hinge 130 such that no distance occurs between first frame 102 and second frame 104. Second frame 104 and third frame 106 are positioned immediately adjacent to each other with no rotation about axis of second frame hinge 112. Clasp arm 134 is connected from third frame 106 to first frame 102 to lock display 100 in the compact position and prevent rotation of first frame 102 and second frame 104 about first frame hinge 122 and prevent rotation of second frame 104 and third frame 106 about second frame hinge 124.

Figure 5:
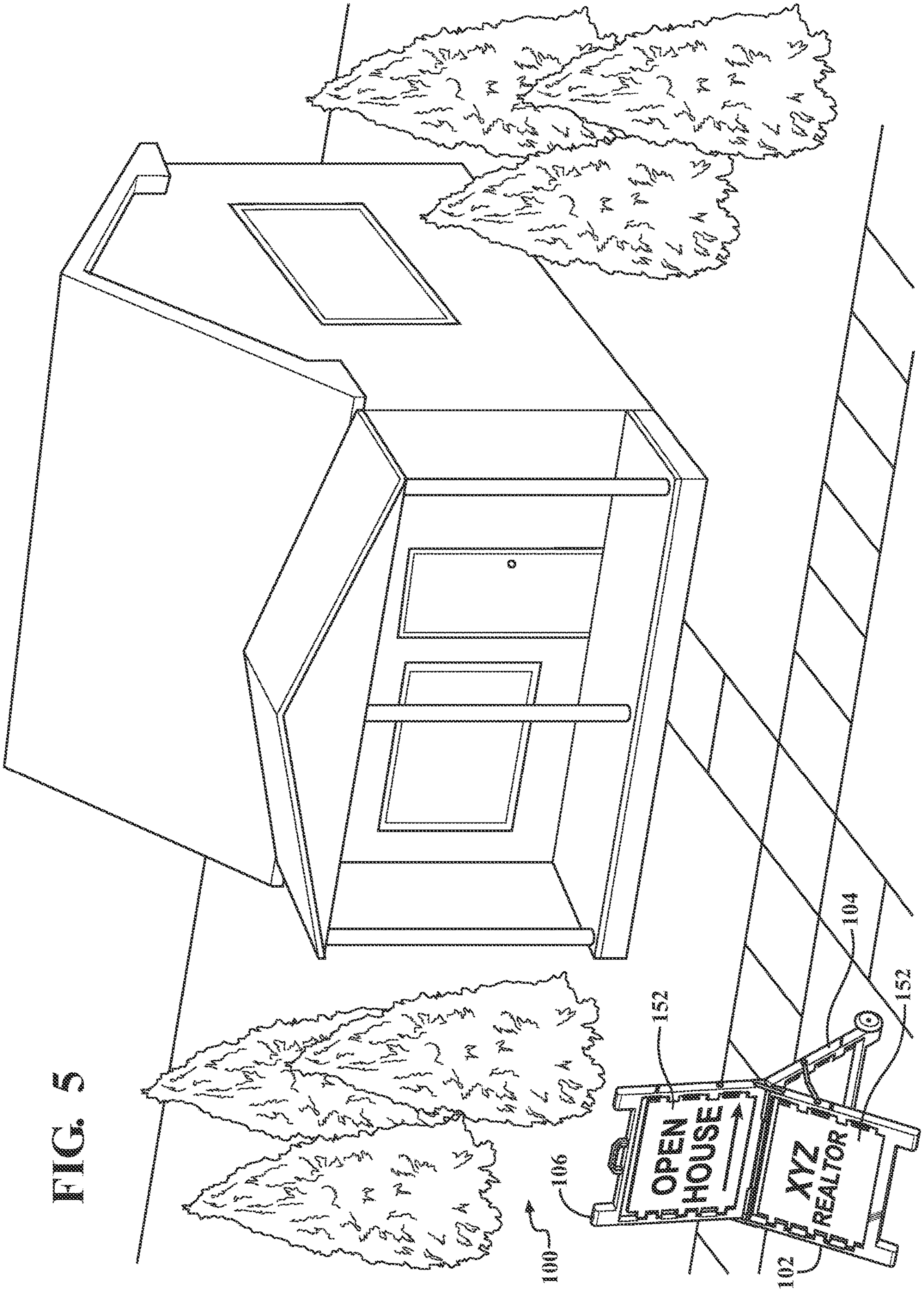
FIG. 5 is a perspective view generally illustrating a foldable sign in a fully deployed position.

As illustrate in FIG. 5, display 100 is in a fully deployed position. Display 100 is illustrated as a visual display for an 'open house' sign used in real estate sales outside of a home for sale. Placard 152 displaying 'open house' with an arrow is inserted on placard engaging surface 150 of outer surface 108 on third frame 106. Tabs 148 keep placard 152 in place on placard engaging surface 150. Individual placards may be placed on each outer surface 108 of each frame 102, 104, 106. For example, in a fully deployed position, placard 152 may be positioned on outer surface 108 of first frame 102, outer surface 108 of second frame 104, and on both outer surfaces 108 of third frame 106, resulting in display of four placards 152. This ensures displays of information may be seen from both sides of display 100 and at varying heights.

FIG. 6 illustrates display 100 in a transport position. In a transport position, first frame 102 and second frame 104 may be positioned immediately adjacent to each other with no rotation about first frame hinge 112. Linkage assembly 118 is in a position allowing the minimum angle between first frame 102 and second frame 104. Third frame 106 is rotated approximately one hundred and eighty degrees from second frame 104 around second frame hinge 112. Rotation between second frame 104 and third frame 106 creates a substantially straight position of display 100, where wheels 146 on second frame 104 are located on the ground, and handle 144 on third frame 106 is located at top of display 100, closest to a user's hand. Transport position allows a user to hold handle and pull display 100 on the ground via wheels 146 from one location to a second location with ease. When user tilts display 100 to pull behind them, wheels 146 are angled such that wheels 146 engage ground and are able to roll on the surface with feet 114 now positioned above ground.

FIG. 7 illustrates a close-up view of frame hinges 110, 112, clasp assembly 132, and linkage assembly 118 of display 100. First frame 102 and second frame 104 are rotatably attached at first frame hinge 110 about first axis 111 at top surface 145 of frames 102, 104. First frame hinge 110 is illustrated as including two ball-bearing hinges at each lateral side of top surface 145. Second frame 104 and third frame 106 are rotatably attached at second frame hinge 112 about second axis 113 at top surface 145 of frames 104, 106. Second frame hinge 112 is illustrated as two ball-bearing hinges at each lateral side of top surface 145. Clasp assembly 132 is clasp arm 134 rotatably attached to third frame 106 at first clasp end 137 via clasp hinge 136. In a locked position, as illustrated, clasp arm 134 is attachable to first frame 104 at a clasp received 138, such as a pin 142. At a second clasp end 139, clasp arm 134 includes cut out 142 which is configured to receive clasp receiver 138 and/or pin 142. Once clasp receiver 138 is received, clasp arm 134 minimizes and/or prevents rotation of first frame 102 and second frame 104 around first frame hinge 110 and second frame 104 and third frame 106 around second frame hinge 112 such that first frame 102, second frame 104, and third frame 106 remain in their designated position. Linkage assembly 118 is illustrated as having a first linkage 122 and a second linkage 124. First linkage 122 is rotatably attached to first frame 102 at first linkage hinge 126. Second linkage 124 is rotatably attached to second frame 104 at second linkage hinge 128. First linkage 122 and second linkage 124 rotatably attach at third linkage hinge 130. When first frame 102 and second frame 104 are adjacent to each other, for instance in a compact position as showed in FIG. 7, first linkage 122 and second linkage 124 are rotated around first linkage hinge 126 and second linkage hinge 128 such that frames 102, 104 may be adjacent with no distance between them and no rotation around the first frame hinge 110. In a deployed position creating base structure 131, as illustrated in FIG. 1, first linkage 122 and second linkage 124 extend in a substantially horizontal manner, creating maximum angle 120 between first frame 102 and second frame 104 around first frame hinge 110.

FIG. 8 illustrates display 100 in a fully deployed position with minor variations to display 100 shown in FIG. 1, for instance the position of handle 144, the configuration of feet 114, and the shape of placard engaging tabs 148. In the illustrated example, handle 144 is integrated into frame 106 as an oval shaped aperture configured to receive a user's hand for transportation of display 100. The illustrated example additionally includes anchoring locations 116 which are hooks 119 that are integrated and are flush with feet 114. Anchoring locations 116 as hooks 119 are configured such that u-shaped pegs or stakes may be placed over hooks 119 and secured to the ground on either side of hook 119. Moreover, the illustrated example includes circular tabs 148 for receiving placards 152. Integrated handle 144 may be used not only as a handle for holding display 100, but additionally as an aperture for being able to reach behind placard 152 and remove placard 152 from placard engaging surface 150. For example, a user may insert hand into aperture and pull placard 152 from top surface to slide placard 152 upward behind placard engaging tabs 148. Handle 144 is positioned in frames 102, 104, 106 such that it abuts the top surface of placard engaging surface 150 to allow for this benefit. It is also illustrated that in an embodiment, display 100 may not include wheels 146. Wheels 146 are shown as an optional element in the embodiment of FIG. 8. Display 100 is positioned on ground via feet 114 in a deployed position. Display 100 may be positioned in a compact position to be carried from one location to another location without use of wheels 146. However, wheels 146 may additionally be added to display 100 as illustrated and described in FIG. 1.

Figure 9:
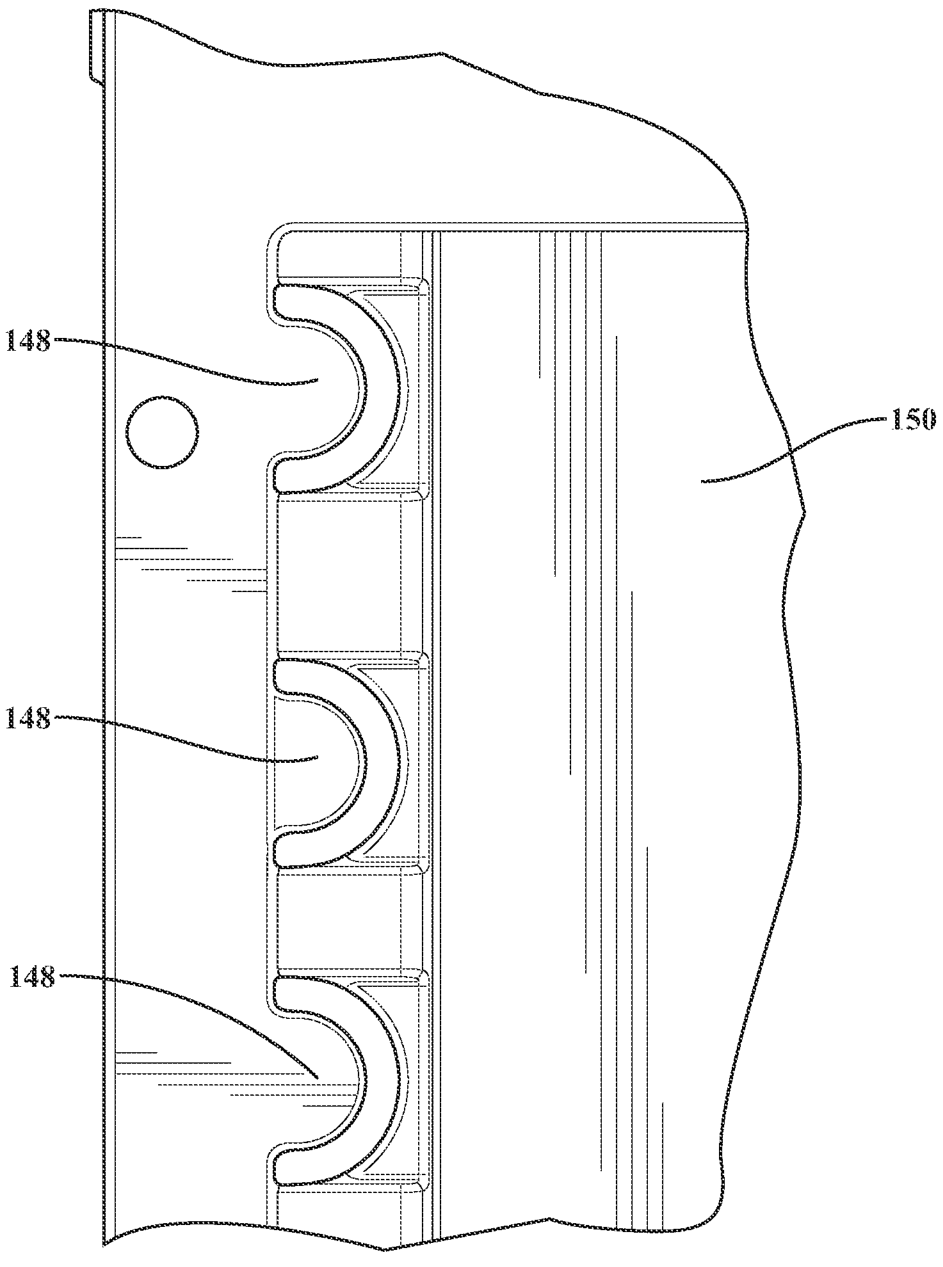
FIG. 9 is a close-up view generally illustrating a close up view of a placard engaging surface and placard engaging tabs.

FIG. 9 illustrates a close-up view of circular tabs 148 which may allow for easier use of tabs and adding and/or removing placard 152 from tabs 148. Circular tabs 148 may be less stiff, catch on placards less, and may be less vulnerable to breaking than tabs with sharp edges. Tabs 148 may be distanced from edge of top and bottom edge of placard engaging surface 150 such that a user may remove placard 152 with ease from corner of placard engaging surface 150. Tabs 148 may include space 154 between the plurality of tabs 148 that is approximately six inches, however additional tabs 148 may be added. Distance between tabs 148 allows for signs of a variety of sizes to be held in place by at least two tabs 148. For example, traditional real estate signs may fit in placard engaging surface 150, but additionally, real estate riders which are narrower than traditional real estate signs may still be placed in placard engaging surface 150 and held in place by at least two placard engaging tabs 148 for stability of sign.

Thus, according to the disclosure, a foldable display which is quick and easy to set up and take down, allows for temporary and reusable surfaces for displaying information, and is designed to withstand weather and unstable surfaces is disclosed.

According to one aspect, a foldable display includes a first frame, a second frame, and a third frame. A first frame hinge rotatably couples the first frame to the second frame about a first axis. A second frame hinge rotatably couples the second frame to the third frame about a second axis. A linkage assembly is attached to the first frame and to the second frame. The linkage assembly limits the maximum angle between the first frame and the second frame about the first frame hinge when the linkage assembly is fully extended. The first frame and the second frame create a base structure when the linkage assembly is fully extended, supporting the foldable display. The foldable display includes a clasp having a clasp hinge. The clasp is attached to the third frame at a first clasp end and via the clasp hinge. The clasp is rotatable about the clasp hinge. The clasp is attachable to the first frame at a second clasp end opposite the first clasp end. The clasp is attachable via a clasp receiver.

According to another aspect, a foldable display system includes a first frame, a second frame, and a third frame. A first frame hinge rotatably couples the first frame to the second frame. A second frame hinge rotatably couples the second frame to the third frame. A linkage assembly is attached to the first frame and the second frame. The linkage assembly limits a maximum angle between the first frame and the second frame when the linkage assembly is fully extended. The first frame, the second frame, and the third frame include an outer surface. The outer surfaces include a placard engaging surface and a set of tabs for receiving a placard on the placard engaging surface.

When introducing elements of various embodiments of the disclosed materials, the articles “a,” “an,” “the,” and “said” are intended to mean that there are one or more of the elements. The terms “comprising,” “including,” and “having” are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of a hybrid power generation system in the sea, it should be appreciated that the present techniques are not limited to such limited contexts. The provision of examples and explanations in such a context is to facilitate explanation by providing instances of implementations and applications. The disclosed approaches may also be utilized in other contexts or configurations.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A foldable display, comprising:

a first frame;

a second frame;

a third frame;

a first frame hinge that rotatably couples the first frame to the second frame and about a first axis;

a second frame hinge that rotatably couples the second frame to the third frame and about a second axis;

a linkage assembly attached to the first frame and to the second frame, the linkage assembly limiting a maximum angle between the first frame and the second frame when the linkage assembly is fully extended, creating a base structure with the first frame and the second frame to support the foldable display; and a clasp having a clasp hinge, the clasp hinge attached to the third frame at a first clasp end and via the clasp hinge, the clasp rotatable about the clasp hinge, the clasp attachable to the first frame at a second clasp end opposite the first clasp end, the clasp attachable via a clasp receiver when the third frame is in a deployed and upright position.

2. The foldable display of claim 1, wherein the clasp is attachable to the first frame at a clasp receiver when the third frame is in a compact and downright position.

3. The foldable display of claim 1, wherein the second clasp end includes a clasp cut out and the clasp receiver is a pin.

4. The foldable display of claim 3, wherein the clasp cutout is configured to receive and lock with the pin when the foldable display is in at least one of the deployed position and the compact position.

5. The foldable display of claim 1, wherein the linkage assembly includes a first linkage hinge and a second linkage hinge, the linkage assembly rotatable about the first linkage hinge at the first frame, and rotatable about the second linkage hinge at the second frame.

6. The foldable display of claim 5, wherein the linkage assembly includes a first linkage attachable to the first frame at the first linkage hinge and attachable to the second frame at the second linkage hinge.

7. The foldable display of claim 5, wherein the linkage assembly includes a first linkage and a second linkage, the first linkage rotatably attached to the first frame at the first linkage hinge, the second linkage rotatably attached to the second frame at the second linkage hinge, and the first linkage and the second linkage rotatably attached to each other at a third linkage hinge.

8. The foldable display of claim 1, further comprising a pair of wheels:

wherein the pair of wheels are attached to the second frame, a first wheel of the pair of wheels attached to a bottom left corner of the second frame and a second wheel of the pair of wheels attached to a bottom right corner of the second frame; and in the deployed position, the pair of wheels do not engage the ground.

9. The foldable display of claim 1, further comprising a handle:

wherein the handle is included in a top surface of the third frame.

10. The foldable display of claim 2, wherein in the compact position, the first frame and the second frame are adjacent to each other, and the second frame and the third frame are adjacent to each other.

11. The foldable display of claim 1, wherein in the deployed position, the first frame and the second frame are rotated about the first frame hinge to the maximum angle allowed by the linkage assembly to create the base structure, and the second frame and the third frame are rotated about the second frame hinge to extend the third frame from a top of the base structure to an upright position.

12. The foldable display of claim 9, wherein in a transportable position, the first frame and the second frame are adjacent to each other, the second frame and the third frame are rotated about the second frame hinge to extend the third frame from a top of the second frame and to position the handle at an uppermost position of the foldable display, and the pair of wheels are engaged with the ground.

13. The foldable display of claim 1, wherein in an intermediate position, the first frame and the second frame are rotated about the first frame hinge to the maximum angle allowed by the linkage assembly to create the base structure, and the second frame and the third frame are adjacent to each other.

14. The foldable display of claim 1, wherein the first frame, the second frame, and the third frame include an outer surface, the outer surfaces including a placard engaging surface.

15. The foldable display of claim 14, wherein the placard engaging surface includes a plurality of placard engaging tabs for receiving a placard.

16. The foldable display of claim 14, wherein the third frame includes two outer surfaces, capable of receiving placards on each of the placard engaging surfaces.

17. The foldable display of claim 1, wherein the first frame, the second frame, and the third frame each include a set of feet, the set of feet being located on a bottom surface of the first frame, the second frame, and the third frame.

18. The foldable display of claim 17, wherein the set of feet include an anchoring location to receive an anchoring device.

19. A foldable display system, comprising:

a first frame, a second frame, and a third frame;

a first frame hinge that rotatably couples the first frame to the second frame;

a second frame hinge the rotatably couples the second frame to the third frame;

a linkage assembly attached to the first frame and the second frame, the linkage assembly limiting a maximum angle between the first frame and the second frame when the linkage assembly is fully extended; and an outer surface of the first frame, the second frame, and the third frame, the outer surfaces including a placard engaging surface and a plurality of tabs for receiving a placard on the placard engaging surface.

20. The placard display system of claim 19, wherein:

in a compact position, the first frame and the second frame are adjacent to each other, and the second frame and the third frame are adjacent to each other; and in a deployed position, the first frame and the second frame are rotated about the first frame hinge to the maximum angle of the linkage assembly creating a base structure, and the second frame and the third frame are rotated about the second frame hinge such that the third frame extends upright from a top of the base structure.

* * * * *